(12) United States Patent
Viering et al.

(10) Patent No.: US 10,341,891 B2
(45) Date of Patent: Jul. 2, 2019

(54) USER EQUIPMENT ADAPTATION OF REPORTING TRIGGERS BASED ON ACTIVE SET SIZE

(71) Applicant: Nokia Technologies Oy, Espoo (FI)

(72) Inventors: Ingo Viering, München (DE); Jarmo Makinen, Espoo (FI); Fasil Berhanu Tesema, Munich (DE); Ahmad Awada, Munich (DE); Andreas Lobinger, Grafing (DE)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 14/790,636

(22) Filed: Jul. 2, 2015

(65) Prior Publication Data
US 2017/0006509 A1    Jan. 5, 2017

(51) Int. Cl.
*H04W 24/10*    (2009.01)
*H04W 36/00*    (2009.01)
(Continued)

(52) U.S. Cl.
CPC ....... *H04W 24/10* (2013.01); *H04W 36/0088* (2013.01); *H04W 36/0083* (2013.01);
(Continued)

(58) Field of Classification Search
CPC ..................................................... H04W 24/10
(Continued)

(56) References Cited

U.S. PATENT DOCUMENTS

2004/0032845 A1    2/2004  Chen
2005/0044130 A1*   2/2005  Sillasto ............... H04L 41/5025
                                                        709/200
(Continued)

FOREIGN PATENT DOCUMENTS

EP    1212918 A1      6/2002
WO    WO-0120942 A1   3/2001
(Continued)

OTHER PUBLICATIONS

3GPP TS 25.331 V12.5.0 (Mar. 2015) Technical Specification 3rd Generation Partnership Project; Technical Specification Group Radio Access Network; Radio Resource Control (RRC); Protocol specification, (Release 12), (Section 8.4).
(Continued)

*Primary Examiner* — Chuck Huynh
(74) *Attorney, Agent, or Firm* — Harrington & Smith

(57) ABSTRACT

When a given user equipment (UE) has a plurality K of cells currently serving it, in various embodiments there is an algorithm for triggering the UE to wirelessly send a cell measurement report. The algorithm utilizes a parameter whose value is dependent on the number K of cells currently in the UE's active set. The UE updates K anytime a new cell is added to, or a serving cell is removed from, the UE's active set. In various examples the parameter is an offset that operates such that for adding a new cell increasing values of K make it more difficult to satisfy the algorithm. One example has the offset's value computed using a slope value provided by the network and a default offset value; another has the offset's value computed using maximum and minimum allowable values of both K and the offset which are provided by the network.

20 Claims, 14 Drawing Sheets

---

STORE IN A UE'S MEMORY AN ALGORITHM FOR TRIGGERING THE UE TO WIRELESSLY SEND A CELL MEASUREMENT REPORT, THE ALGORITHM UTILIZING A PARAMETER (SUCH AS $Off_{add}$ OR $Off_{remove}$) WHOSE VALUE IS DEPENDENT ON A NUMBER K OF CELLS CURRENTLY IN THE UE'S ACTIVE SET OF SERVING CELLS —702

THE UE UPDATES THE NUMBER K WHEN IMPLEMENTING THE STORED ALGORITHM ANYTIME A NEW CELL IS ADDED TO, OR A SERVING CELL IS REMOVED FROM, THE UE'S ACTIVE SET —704

THE UE SENDS A MEASUREMENT REPORT IN RESPONSE TO THE IMPLEMENTED ALGORITHM BEING SATISFIED —706

(51) Int. Cl.
*H04W 36/18* (2009.01)
*H04W 36/30* (2009.01)

(52) U.S. Cl.
CPC .. *H04W 36/0094* (2013.01); *H04W 36/00837* (2018.08); *H04W 36/18* (2013.01); *H04W 36/30* (2013.01)

(58) Field of Classification Search
USPC ..................................... 455/436, 422.1, 442
See application file for complete search history.

(56) References Cited

U.S. PATENT DOCUMENTS

| | | | | |
|---|---|---|---|---|
| 2007/0225013 | A1 | 9/2007 | Pflum et al. | 455/452.2 |
| 2012/0243504 | A1* | 9/2012 | Hsieh | H04W 36/06 370/331 |
| 2012/0281544 | A1 | 11/2012 | Anepu et al. | 370/241 |
| 2013/0090111 | A1* | 4/2013 | Chang | H04W 24/10 455/422.1 |
| 2013/0114418 | A1 | 5/2013 | Kuboa et al. | |
| 2013/0235844 | A1 | 9/2013 | Ge et al. | |
| 2015/0181495 | A1 | 6/2015 | Matin et al. | 36/61 |

FOREIGN PATENT DOCUMENTS

| | | |
|---|---|---|
| WO | WO-2012/061770 A2 | 5/2012 |
| WO | WO-2013/067405 A1 | 5/2013 |

OTHER PUBLICATIONS

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 12), (Section 10.1.3).

3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12), (Section 5.5).

3GPP TS 36.133 V12.7.0 (Mar. 2015) Technical Specification 3rd Generation Partnership Project; Technical Specification Group Radio Access Network; Evolved Universal Terrestrial Radio Access (E-UTRA); Requirements for support of radio resource management (Release 12), (1014 pages).

* cited by examiner

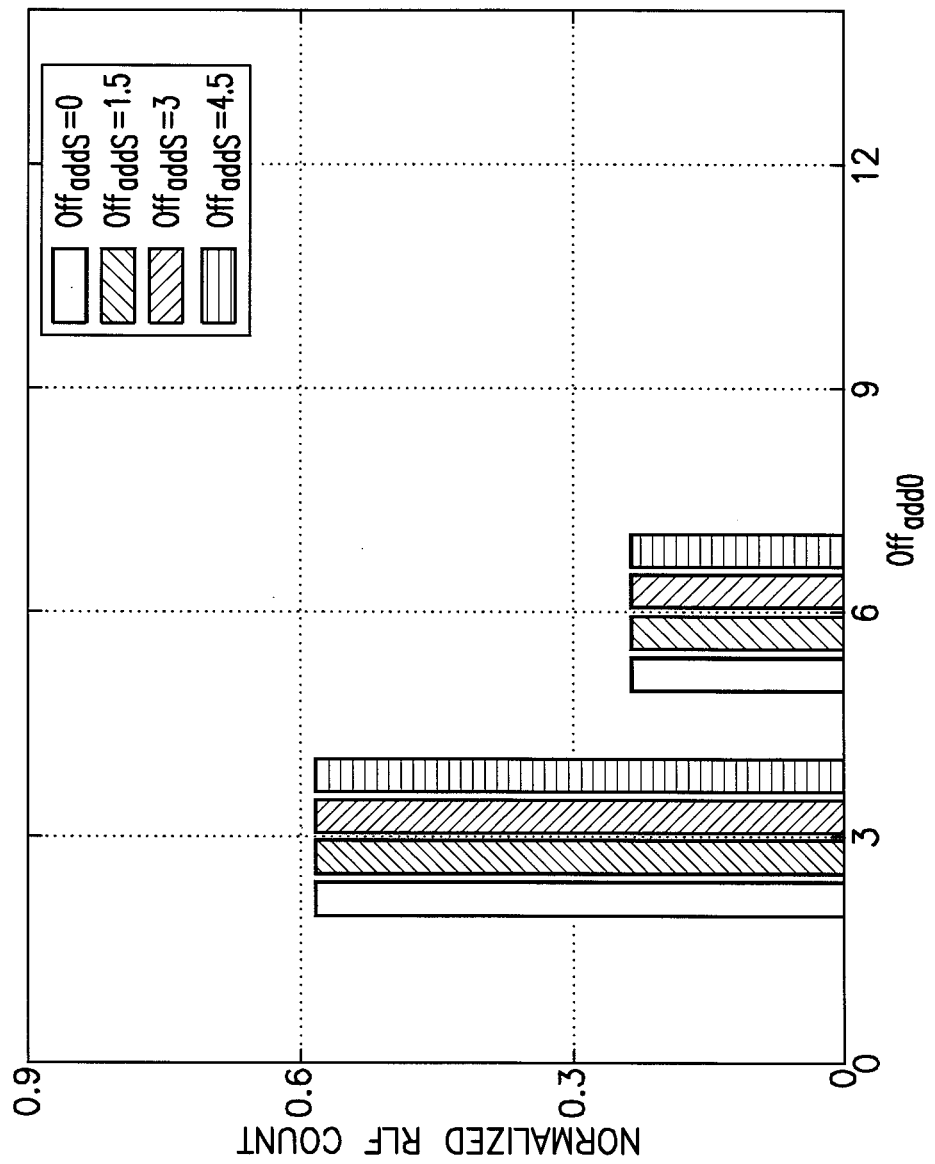

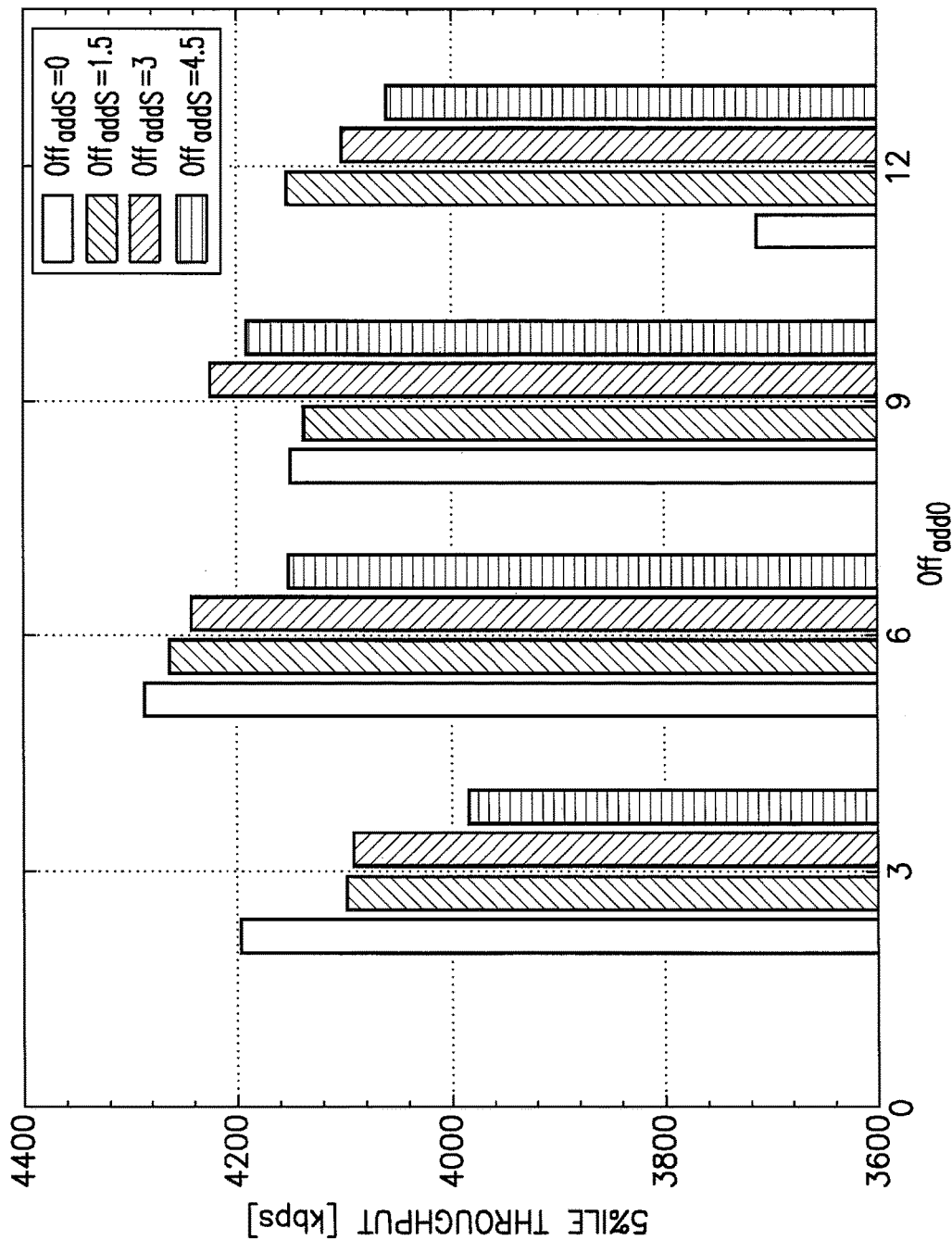

| Off$_{add0}$ | Off$_{addS}$ | 5-PERCENTILE THROUGHPUT | 50-PERCENTILE THROUGHPUT | AVERAGE THROUGHPUT | ACTIVE SET UPDATE |
|---|---|---|---|---|---|
| 9 | 1.5 | -0.31 % | 1.89 % | 1.39 % | 10.14 % |
| 9 | 3 | 1.76 % | 3.05 % | 1.1 % | 18.16 % |
| 9 | 4.5 | 0.96 % | 3.6 % | 0.81 % | 23.88 % |
| 12 | 1.5 | 11.85 % | 5.4 % | 3.23 % | 12.66 % |
| 12 | 3 | 10.53 % | 6.84 % | 4.3 % | 16.38 % |
| 12 | 4.5 | 9.38 % | 8.12 % | 4.99 % | 22.11 % |

FIG.6

USER EQUIPMENT ADAPTATION OF REPORTING TRIGGERS BASED ON ACTIVE SET SIZE

TECHNOLOGICAL FIELD

The described invention relates to wireless communications, and more particularly to the triggering of cell measurement reports by a user equipment in a cellular system such as where the user equipment has multiple serving cells simultaneously.

BACKGROUND

In conventional cellular systems a mobile terminal is connected to a single cell and when that terminal moves from the serving area of one cell to the serving area of another cell, typically a handover is initiated. The full picture of all cells in the area surrounding the terminal is only available at the terminal itself. However, a general paradigm of a well-organized cellular network is that the network makes the mobility decisions, and not the terminal.

One solution to get all the information at the user equipment (UE) about its surrounding cells would for the terminal to permanently send measurement reports to the network, but this would require too much signalling overhead. Instead, current E-UTRAN LTE (evolved UMTS Terrestrial Radio Access Network, Long Term Evolution, also known as 4G) specifications allow the network to configure triggers for the terminal. If such a network-configured trigger expires in the terminal the terminal will in response send a measurement report. The idea is that the network configures the triggers such that a handover is initiated when such a measurement report is received. This minimizes the signalling overhead by limiting the number of measurement reports that are sent.

For intra-frequency handovers in LTE, the most prominent trigger for a measurement report is the A3 trigger which in simplified terms is defined as follows:

$$Mn+Ocn>Ms+Off.$$

It expires if the measurement Mn of a neighbor n is offset (the value of Off) better than the measurement Ms of a serving cell. The measurements could be given as signal strength (such as reference signal received power/RSRP) or as a signal quality (such as reference signal received quality/RSRQ). The offset Off introduces a kind of hysteresis to the handover decision to avoid the well-known 'ping-pong' effect.

Ocn is another offset (also called "cell individual offset") which, in contrast to Off is specific to an individual neighbor cell. It can be used to fine-adjust the handovers individually towards different neighbor cells due to mobility robustness reasons (e.g., make the neighbor more attractive if it is entered through a high-speed street), or due to load balancing reasons (e.g., make the neighbor cell more attractive if it is experiencing low traffic loading).

A brief overview on seven of the LTE measurement report triggers may be seen at http://www.rfwireless-world.com/Terminology/LTE-UE-Event-Measurement-Reporting.html (last visited Jun. 23, 2015). Further detail on known measurement report triggers may be seen at international patent publication WO 2014/021763, as well as technical specifications 25.331 (v12.5.0) at section 8.4 "Measurement procedures"; 36.300 (v12.5.0) at sections 10.1.3 and 10.2.3 each entitled "Measurements"; and 36.331 (v12.5.0) at section 5.5.4 "Measurement report triggering".

Another option is to dispense with the terminals' measurement reports and instead have the network perform measurements itself on the terminals' respective uplink signalling. This option makes several assumptions, namely that the terminals are permanently transmitting (such that the network can measure at all), that the network will know with a reasonably high degree of accuracy the terminals' respective transmit powers, and that the cells will be able to exchange all these various uplink measurements with one another in a timely manner. But the circumstances under which all those assumptions would hold true collide with several other requirements such as the terminal's energy consumption in view of its limited portable power supply. The inventors see this option as a supplement to support or improve terminal measurements but not suitable to replace them in a practical system.

In E-UTRAN LTE, the Cooperative Multi-Point (CoMP) transmission scheme allows a given user equipment (UE) to be served by multiple cells simultaneously, but still only one is handling the control plane of the UE and is generally referred to as the primary cell or PCell, while the other serving cells are secondary cells or SCells. The connection of the terminal purely depends on the PCell which is changed by a conventional handover. If the control plane on the PCell has radio problems, the other SCells cannot serve as a fallback.

In 3G soft handover, a UE is configured with an active set of cells that transmit the same content to the UE on independent links which are combined at the receiver side, i.e., control information is sent from each cell. Similar to 3G soft handover, it is anticipated that in future cellular systems such as 5G a given UE may have multiple serving cells in the active set handling both the user and control planes. Otherwise, the connection would rely only on a single cell, and there would be no control-channel robustness benefit. Whereas in LTE the UE's active set refers to its PCell and any of the SCells, in the description below the term 'active set' refers to all the UE's simultaneous serving cells handling both user and control planes of the UE (and for simplicity of explanation it is assumed below that all these active cells are on the same frequency layer, or 'intra-frequency' cells). In the overview of FIG. 1 assume the UE has 3 serving cells as shown and is moving towards a new cell that is not (yet) in its active set. The parameters of trigger events defined for instance in 3G for adding, removing or replacing a cell in the active set are fixed and they are not tailored for each UE leading to sub-optimal performance in terms of throughput and number of active set updates. The examples below address how to solve this problem.

SUMMARY

In one aspect the invention includes a method comprising: storing in a memory of a user equipment (UE) an algorithm for triggering the UE to wirelessly send a cell measurement report, the algorithm utilizing a parameter whose value is dependent on a number K of cells currently in the UE's active set of serving cells, where K is an integer greater than one; the UE updating the number K when implementing the stored algorithm anytime a new cell is added to, or a serving cell is removed from, the UE's active set; and the UE sending a measurement report in response to the implemented algorithm being satisfied.

In another aspect the invention includes an apparatus comprising: at least one processor, and at least one non-transitory memory including computer program code comprising an algorithm for triggering a user equipment (UE) to wirelessly send a cell measurement report, the algorithm utilizing a parameter whose value is dependent on a number K of cells currently in the UE's active set of serving cells, where K is an integer greater than one. In this aspect the at least one memory and the computer program code configured, with the at least one processor, to cause the apparatus to: update the number K when implementing the stored algorithm anytime a new cell is added to, or a serving cell is removed from, the UE's active set; and cause the UE to send a measurement report in response to the implemented algorithm being satisfied.

In a further aspect the invention includes a non-transitory program storage device readable by a machine, tangibly embodying a program of instructions executable by the machine for performing operations. The program storage device has stored there on an algorithm for triggering a user equipment (UE) to wirelessly send a cell measurement report, the algorithm utilizing a parameter whose value is dependent on a number K of cells currently in the UE's active set of serving cells, where K is an integer greater than on. The operations comprise: causing the UE to update the number K when implementing the stored algorithm anytime a new cell is added to, or a serving cell is removed from, the UE's active set; and causing the UE to send a measurement report in response to the implemented algorithm being satisfied.

Other embodiments of these teachings may be implemented by the network-side of the network-UE divide, for example by a network access node or one or more components thereof. In this regard an aspect the invention includes an apparatus comprising at least one processor; and at least one non-transitory memory including computer program code that is configured, with the at least one processor, to cause the apparatus to determine whether to add a new cell to or remove an existing cell from a UE's active set of serving cells; reconfigure the UE when a new cell is added to or an existing cell is removed from the UE's active set of serving cells; and provide to the UE at least one value for computing a parameter whose value depends on the number K of cells in the UE's active set, where K is an integer greater than one, the parameter is for use in an algorithm that triggers the UE to send the cell measurement report, and the provided value is other than K. At the UE the sending of the cell measurement report is triggered by such an algorithm, and as will be detailed below this parameter can be for example an offset and the above at least one value that the network side sends is in one embodiment a default offset value and/or a slope for computing the value of that offset parameter, while in another embodiment the at least one value that the network side sends is one or more minimum and maximum values for computing the value of that offset parameter. Apart from such an apparatus which may be the network access node or components of it, these embodiments may be implemented as a method and/or as a non-transitory program storage device readable by a machine and tangibly embodying a program of instructions executable by the machine for performing these operations These aspects and others are detailed further below with particularity.

BRIEF DESCRIPTION OF THE DRAWINGS

FIGS. 5A-5E are data plots of various key performance indicators (KPIs) for different values of initial offset $Off_{add\,0}$ and slope $Off_{addS}$, comparing one implementation of an adaptive parameter configuration and trigger event according to these teachings against an equivalent 3G soft handover trigger event.

FIG. 6 is a table summarizing the data plotted at FIGS. 5B-5E for $Off_{add0}=9$ and 12 dB and different slope values of $Off_{addS}$.

DETAILED DESCRIPTION

Figure 1:
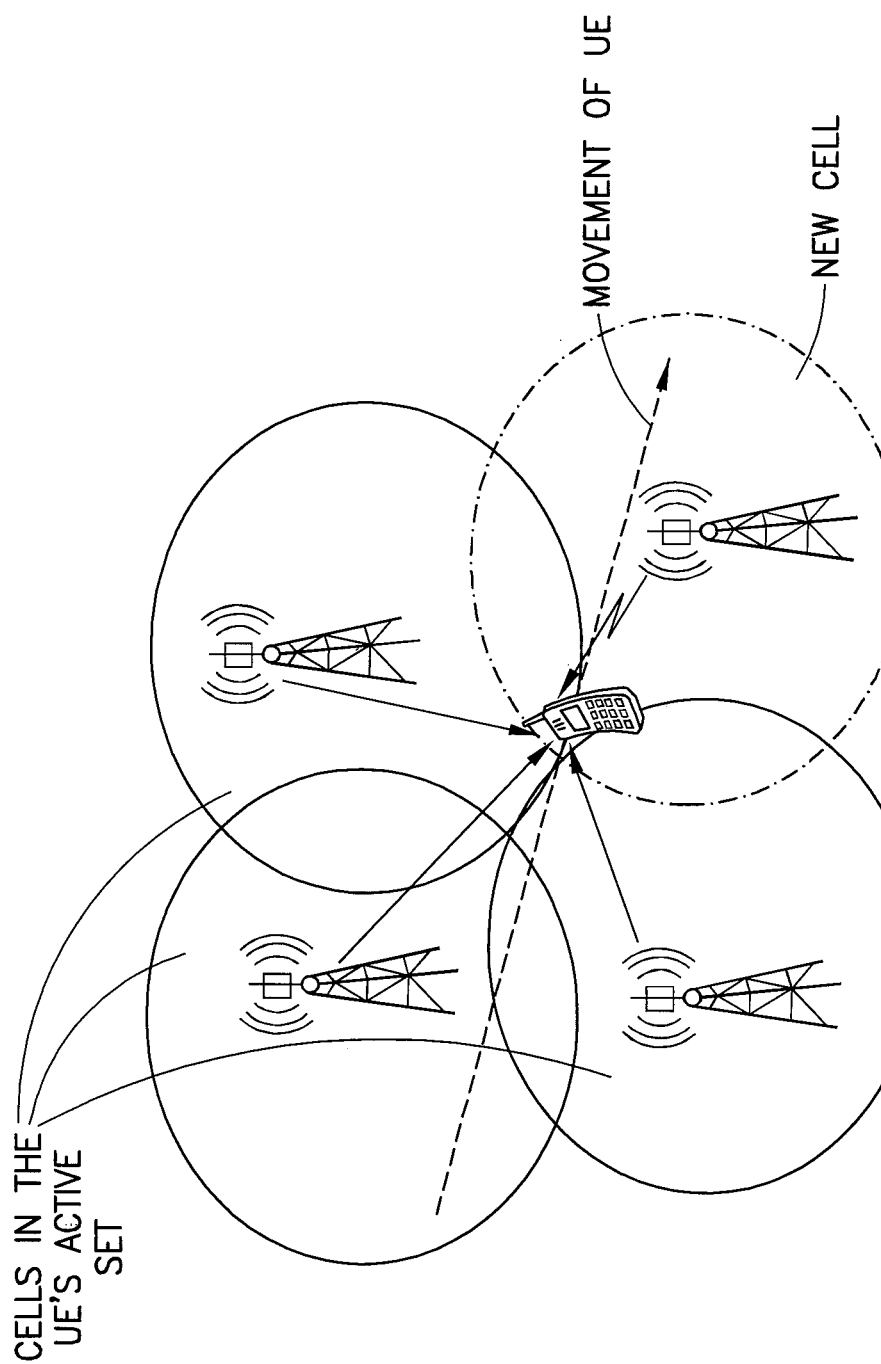
FIG. 1 is a conceptual diagram illustrating a user equipment UE with three serving cells in its active set and moving towards a fourth cell that is not yet in its active set.

As set forth above, a problem arises in how to tailor the parameters of measurement reporting triggers for each UE when the radio environment allows for multi-connectivity where there is not only a single serving cell handling also the control plane for a given UE but there are multiple serving cells. Certain embodiments of these teachings resolve this issue by building from what is known as a 3G soft handover, for example the 1A trigger event detailed further below, and linking the parameter $Off_{add}$ in that trigger event with the size K of the UE's active set (where K is of course a positive integer). This enables the UE to autonomously adapt the configuration of its measurement report trigger condition based on the current size of the UE's active set. It is anticipated that for 5G the network will decide to add a new serving cell to, or remove a currently serving cell from, the UE's active set, and so the size K of that set for any given UE is controlled by the network. But in the example embodiments of these teachings the UE autonomously adapts its trigger condition by updating that trigger event to reflect any changes to the current value for K. That is, when the network changes the size K of the UE's active set, the network may reconfigure the UE for that new set size K but it does not specifically direct the UE to also adapt its cell measurement report trigger event, the UE adapts that event autonomously. As will be detailed below, in one example implementation the network can define an initial default $Off_{add0}$ and a slope $Off_{addS}$. If the current active set size is K then the terminal would use equation (1) below. Another example implementation considers maximum and minimum values for $Off_{add}$, (e.g., $Max\_Off_{add}$ and $Min\_Off_{add}$), as well as maximum and minimum values for the size of the active set K (e.g., $K_{max}$ and $K_{min}$). In this case if the current set size is K then the terminal would use equation (2) below. Certain embodiments of the invention described below have the UE autonomously adapting the configuration of the trigger events for measurement reports while still allowing the network to make decisions for adding or removing cells from the UE's active set. These certain embodiments have this autonomous adaptation based on the size of the UE's active set, following rules and additional parameter values that are either provided by the network or which are standardized (e.g., published in the controlling wireless protocols).

Before detailing these specific solutions with more particularity it is helpful to review some details of existing measurement report triggers for various cellular architectures that are relevant to understanding the new types of triggers that are described herein. In CoMP as well as dual-connectivity one and only of the cells in the UE's active set is a PCell and so defining the report triggers is straightforward: the single PCell is in the position of the serving cell with respect to the UE's measurement condition. In the 3G UTRAN cellular protocols there is a 3G Soft Handover known more formally as a "1A" event detailed further below which is similar to the A3 event mentioned in the background section above.

In the CoMP measurement reporting in the LTE system the SCells cannot serve as a fall back since they do not transmit any control information and do not improve the control-channel robustness (and thus will not improve UE mobility). The LTE target for CoMP was to increase (cell edge) throughput at low velocities. It does this fairly well but that goal is not suited to the problem this invention resolves, for in 5G the goal is to improve mobility as well so there cannot be a single cell (PCell or otherwise) that handles all C-plane signalling; all cells need to be able to do so.

Figure 2A:
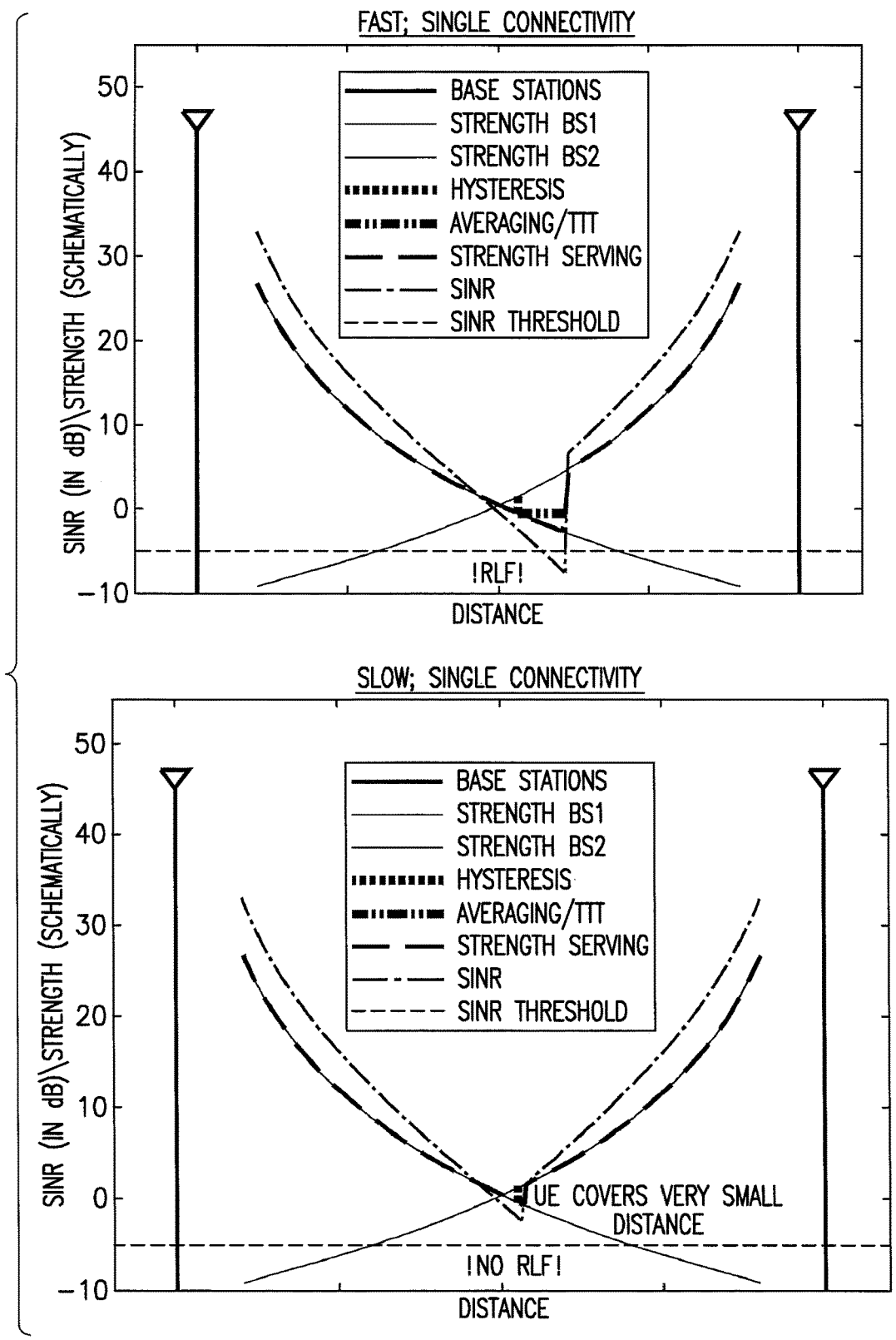
FIG. 2A are data plots for a fast and a slow moving terminal handing over between two base stations, where the terminal can be connected to only one base station/cell at a time.

FIG. 2A graphically illustrates UE connectivity for the single connectivity case where the UE is connected to only one cell; the diagram at the left side of FIG. 2A represents a fast-moving terminal/UE while that on the right side represents a slow-moving terminal/UE. With single connectivity for a fast-moving terminal at the left side of FIG. 2A, averaging and time to trigger (TTT) will lead to a radio link failure (RLF), and at the same time the signal to interference-plus-noise ratio SINR (and thereby the throughput) degrades. For a slow-moving terminal the right side of FIG. 2A shows that the degradation during averaging and TTT is negligible.

Figure 2B:
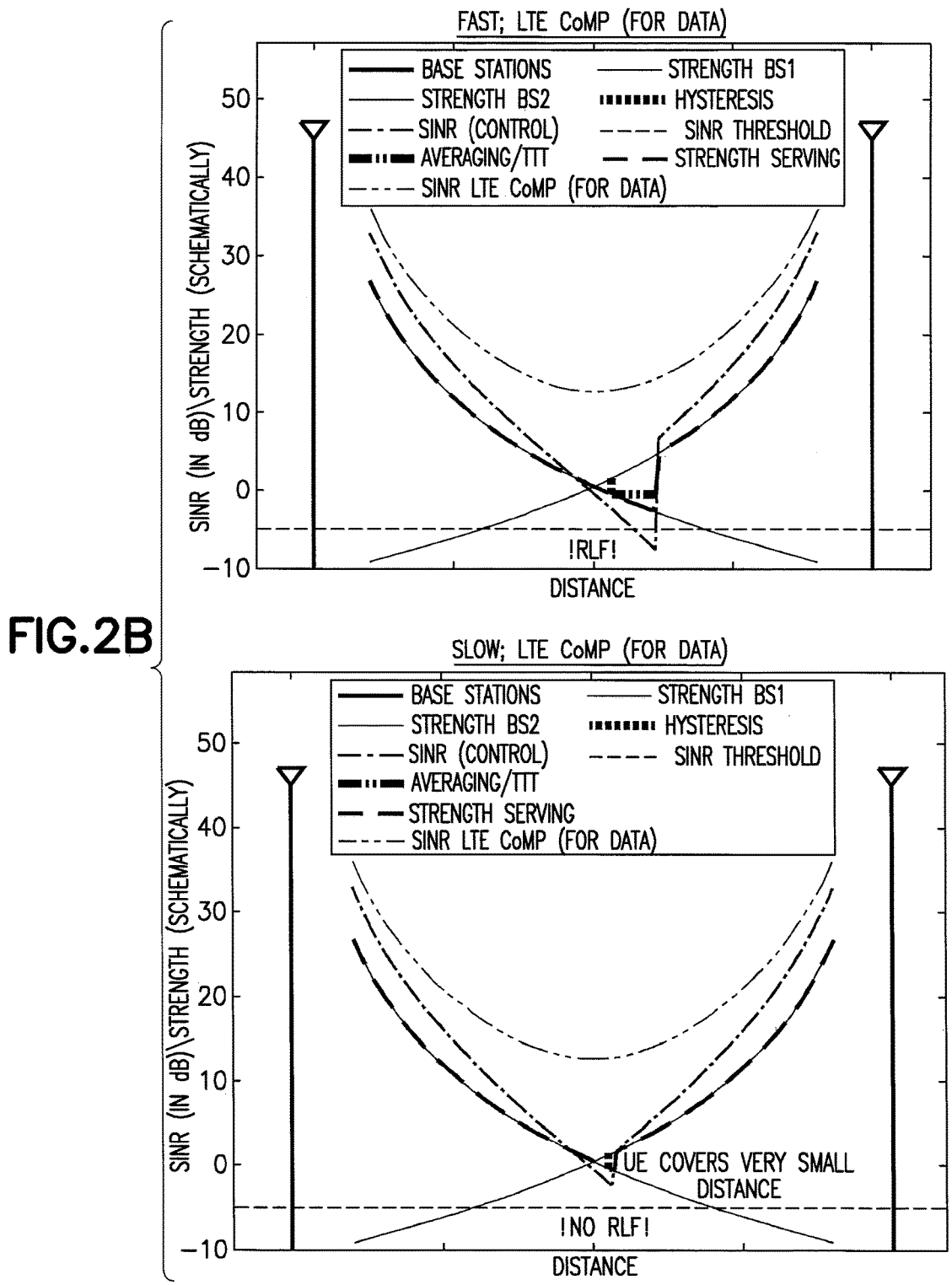
FIG. 2B are data plots similar to FIG. 2A but for the CoMP scenario of LTE in which the terminal can be simultaneously served by multiple cells but only one of them handles control-plane signaling.

FIG. 2B graphically illustrates the benefits and drawbacks of the LTE CoMP solution, and similar to FIG. 2A the left and right diagrams represent fast-moving and slow-moving terminals, respectively. As compared to the single-cell baseline plots for FIG. 2A, the LTE CoMP solution shown in FIG. 2B significantly improves the SINR on the data channel (and thereby the throughput) but not on the control channels. This is adequate for the slow terminal (right side), but not on the fast terminal (left side) which still is subject to RLF as shown.

Figure 2C:
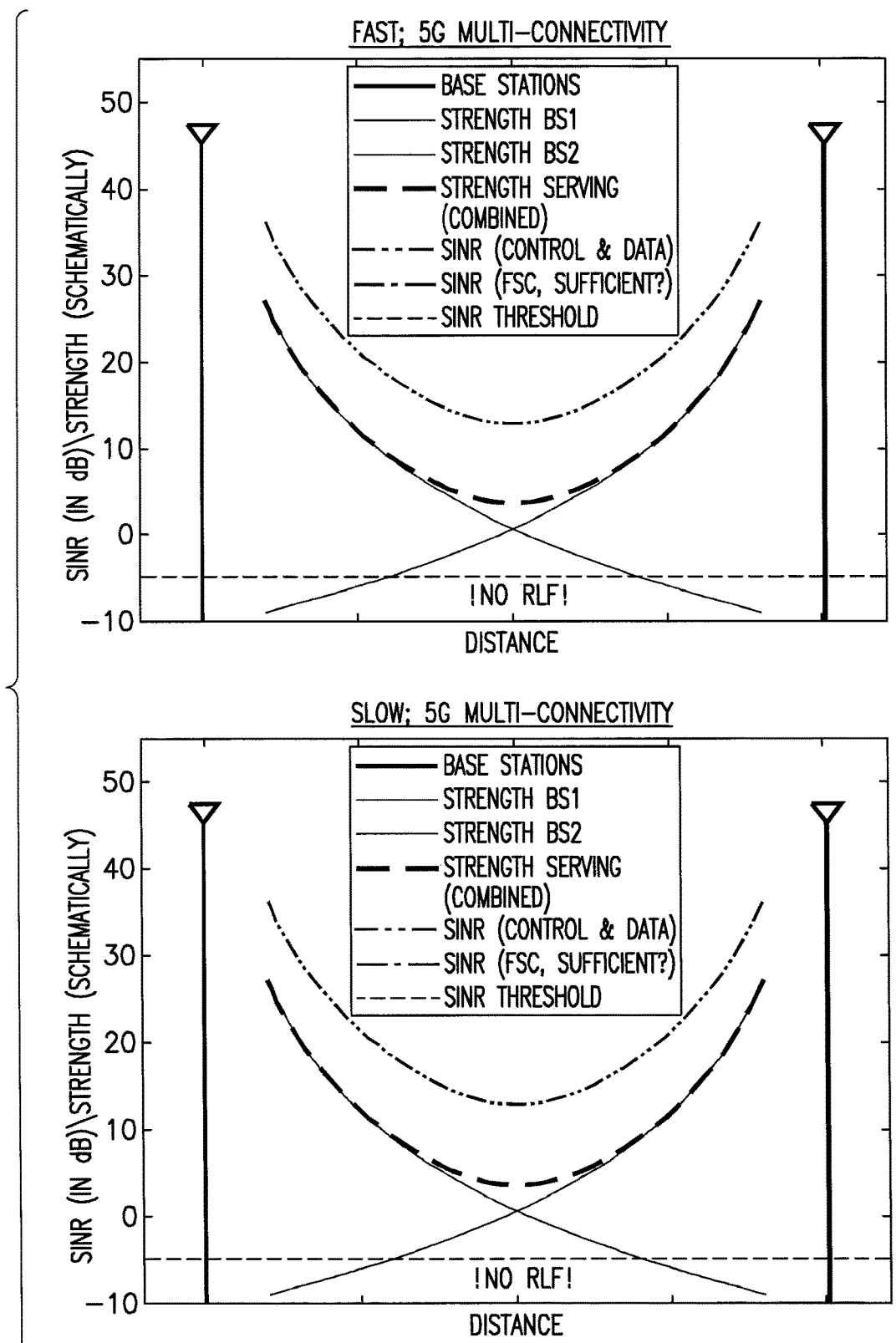
FIG. 2C are data plots similar to FIG. 2A but for a proposed scenario for 5G networks in which the terminal can be simultaneously connected to multiple cells, each of which can handle control-plane signaling.

FIG. 2C graphically illustrates the mobility advantages in case of C-plane multi-connectivity as expected for 5G cellular systems, again with left and right diagrams representing fast-moving and slow-moving terminals, respectively. Gains to the control channels improve mobility and reduce the potential for RLF and at FIG. 2C the RLF is not present even for the fast-moving terminal. But from FIG. 2C it is obvious that the gains over CoMP and single cell connectivity will only be achieved if the second link is added early enough. While the plots of FIG. 2C only considers two cells, it is expected that in the 5G system it will not be unusual at all to add a third or even more cells to a UE's active set. It follows from this that also there will be a need to remove cells from any given UE's active set.

LTE also utilizes dual connectivity which is inter-frequency; i.e., the UE is connected to two cells on different frequencies. To some extent, all cells have their own C-plane which in the inter-frequency case is not a problem since there is frequency separation and thus no interference between the cells. Nevertheless, just as in CoMP there is a PCell defined, and the measurement reports for dual connectivity LTE use the PCell as a reference for the measurement report triggers.

In 3G (UTRAN) cellular systems the soft handover already defines an active set, with appropriate triggers to update the active set. For instance, TS 25.331 has defined the "1A" event which in simplified form is:

$$Mn + Ocn > \max_{s \in A}(Ms) + Off_{add},$$

where the symbol A is used for the active set, i.e. A is a set consisting of a number of serving cells s1, s2, . . . . In 3G the cells in the set A transmit the same content to the UE on independent links, but in 5G the radio interface and architecture are different from 3G.

Such a condition expires if the measurement Mn of a "new" cell n is offset better than the measurement of the best cell in the current active set. Expiry of the 1A event would trigger a measurement report by the UE to the base station, and the base station would add the new cell n to the active set. In contrast to a typical hysteresis value, in this case $Off_{add}$ is likely to be a negative value, meaning that a new cell can be added to the active set even if it is still weaker than the best cell. Similar to the multi-connectivity case in 5G that these teachings address, this is a reasonable decision since still the best cell is kept and not dropped as in the case of a single connectivity handover.

Similar to the definition of the 1A trigger event, there is also in 3G a second trigger event 1B to remove a cell from the active set. The network removes a cell s0 from the active set A when a measurement report is received which has been triggered by the following condition:

$$Ms0 + Ocs0 < \max_{s \in A}(Ms) + Off_{remove},$$

In this case a cell would be removed if it falls significantly below the best cell (for a certain time-to-trigger). In order to avoid the alternating addition and removal of the same cell (similar to a ping pong effect), there should be a difference between $Off_{add}$ and $Off_{remove}$. For example, assume the following values: Ocn=0; Ocs0=0; (for simplicity); $Off_{add}$=−6 dB; and $Off_{remove}$=−8 dB. These values result in the following:

A cell would be added using event 1A when it comes closer than 6 dB to the best cell; when $$Mn > \max_{s \in A}(Ms) - 6 \text{ dB};$$

and

A cell would be removed using event 1B when it falls more than 8 dB below the best cell; when $$Mn < \max_{s \in A}(Ms) - 8 \text{ dB}.$$

This condition would need to be fulfilled for a certain time period (known as the "time-to-trigger"), whereas in every time instance the condition is being evaluated using the best of all cells.

The 5G system anticipates enhancing mobility performance by appropriately adding and removing cells from the active set in order to make sure that the best cells are always in the active set, even for high velocities and quickly changing channels (and long averaging). To support this, certain embodiments of this invention define appropriate triggers for measurement reports to allow network decisions to add and remove cells from the active set. In order to explain the invention in the clearest term, first are presented a few specific examples followed by a more generalized description of the underlying concepts.

As noted above the examples described herein build from the 3G soft handover triggers. But note that in the same 5G or other system that employs triggers according to these teachings can also employ further triggers for adding or removing cells from the active set, or even for replacing cells in the active set. One aspect of these teachings to keep in mind when considering the specific examples below is that the UE autonomously adapts the configuration of the trigger events based on the size of the active set, following rules and additional parameter values which are provided by the network or specified in the controlling wireless standard(s).

With regard to the above mentioned time-to-trigger criteria during which the trigger condition must be met for a measurement report to be sent, the time-to-trigger can be based on the UE's mobility so that a fast-moving UE would autonomously scale down the network-configured time-to-trigger, and a slow-moving UE would scale it up. The "slope" of a plot of this speed-dependent scaling is configured by the network and the rule implementing this scalable time-to-trigger is part of the controlling wireless standard.

With regard to the UE's active set of serving cells, clearly this set should not be unnecessarily large. Whereas a second link with a second cell would obviously add a lot of diversity/robustness over the first link, there are diminishing returns for the fourth and fifth (etc.) links which one would expect would add only minimal additional benefits while increasing complexity (unnecessarily).

In the above description of existing triggers the parameter $\text{Off}_{add}$ is static. Certain embodiments of these teachings enable the network to instruct the terminal to dynamically adapt a parameter such as $\text{Off}_{add}$ depending on the size of the terminal's active set. As one example, the network can define an initial default $\text{Off}_{add0}$ and a slope $\text{Off}_{addS}$, such that if the current active set size is K then the terminal would use $$\text{Off}_{add} = \text{Off}_{add0} - (K-1) \cdot \text{Off}_{addS}. \quad (\text{Eq. 1})$$

This has the effect of making it increasingly difficult for a neighboring cell to enter the active set as the active set grows larger.

In another implementation there are maximum and minimum values for $\text{Off}_{add}$, which are represented herein as $\text{Max\_Off}_{add}$ and $\text{Min\_Off}_{add}$. In this implementation there can also be maximum and minimum values for the size of the active set K, represented herein as $K_{max}$ and $K_{min}$. If we represent the current set size as K then in one example of this implementation the terminal would use $$\text{Off}_{add} = aK + b \quad (\text{Eq. 2})$$

where $$a = \frac{(\text{Max\_Off}_{add} - \text{Min\_Off}_{add})}{(K_{max} - K_{min})}$$

and $$b = \text{Max\_Off}_{add} - a * K_{max}.$$

Now consider a specific example of the above implementation using the following values: $\text{Max\_Off}_{add}=-1$ dB, $\text{Min\_Off}_{add}=-6$ dB, $K_{min}=2$ and $K_{max}=7$. This yields $$\text{Off}_{add} = K-8.$$

So if K=2 then $\text{Off}_{add}=-6$ dB, if K=4 then $\text{Off}_{add}=-4$ dB, and if K=7 then $\text{Off}_{add}=-1$ dB. This example makes clear that the higher the size of the active set K, the higher is the value of the offset $\text{Off}_{add}$. There are several ways to implement this if the implementing algorithm requires $\text{Off}_{add}$ to be an integer, rounding $\text{Off}_{add}$ to the nearest integer or applying a floor or ceiling operator.

The dynamic procedure described above for the offset value can be equivalently applied to one, some or all of the measurement report trigger configuration parameters.

In certain practical instances it may not be possible to add any new cell to the active set. For example, adding a new cell may only be possible if the new cell has a certain relation/connection to the cells of the UE's current active set, for example if the new cell is in the same "cloud"/same baseband pool. If a new cell does not have this relation, it cannot be added to the active set, so the trigger as explained above would not apply. However, if this new cell becomes stronger a handover to that new cell should be initiated.

But for handing over to such a new cell the traditional trigger conditions that assume only a single cell (PCell) as reference are again not suitable. In this case, certain embodiments of these teachings can utilize the same trigger conditions as detailed above but with a different parameter value for Off_add, Off_remove, Ocs0 and Ocn in order that the trigger for the new cell that is not in the same baseband pool as the UE's existing active set cells expires much "later" than the "early" trigger by which a new cell that is within that same baseband pool can be added to the UE's active set. Note that in this case the "later" trigger would more likely lead to a handover; the lateness of this trigger makes it much more likely that this new cell not in the active set's baseband pool would adequately serve the UE alone.

More generally, in this implementation the network should configure two instances of the triggers, a first trigger instance which shall apply to neighbors which can be added to the UE's currently active set, and a second trigger instance which shall apply to neighbors which cannot be added to the UE's currently active set. As a simple example, the network's configuration for these two trigger instances may be as follows:

The terminal shall report a cell which can be added to the active set when $$Mn > \max_{s \in A}(Ms) - 6 \, \text{dB};$$

and

The terminal shall report a cell which cannot be added to the active set when $$Mn > \max_{s \in A}(Ms) + 3 \, \text{dB}.$$

Figure 3:
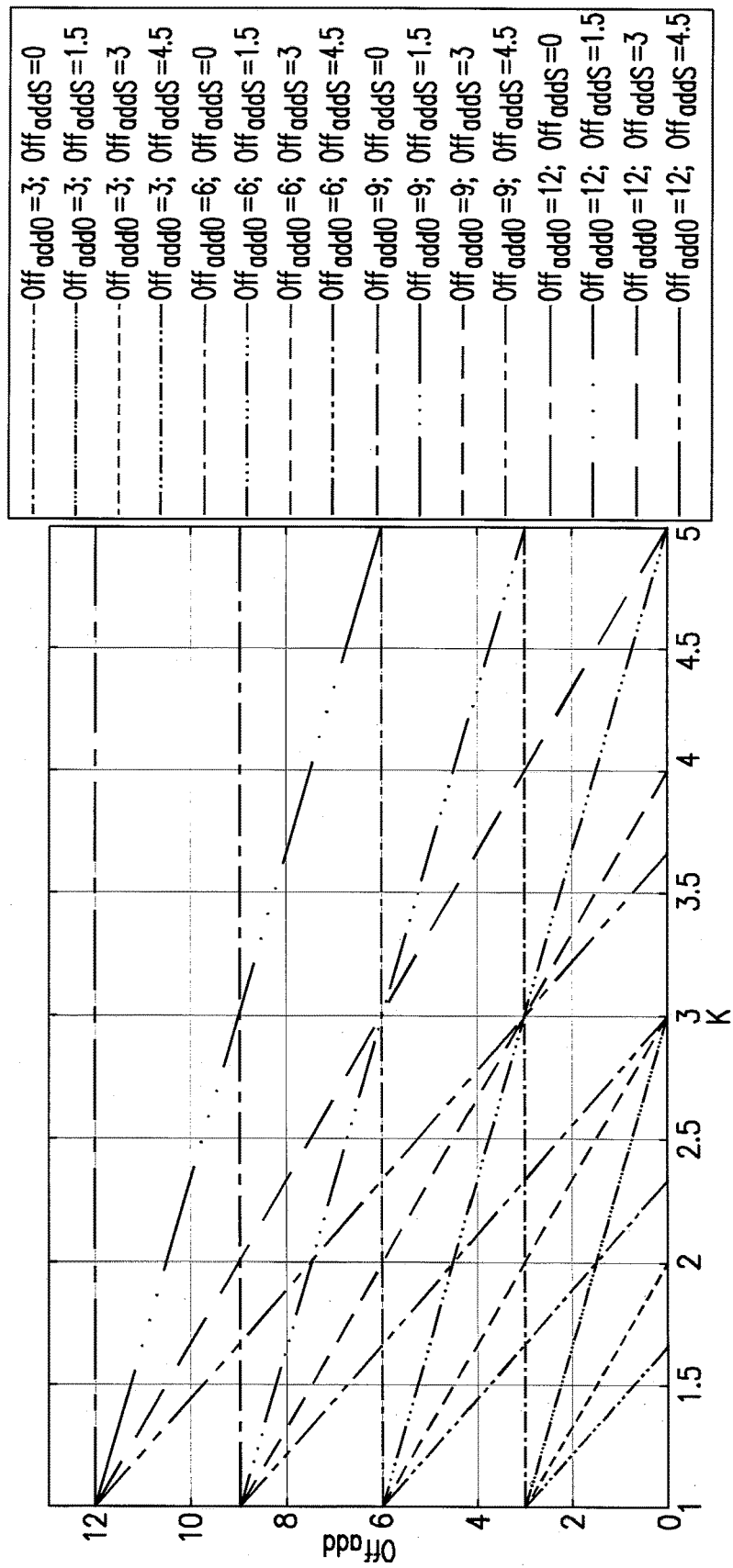
FIG. 3 is a data plot of simulation results using equation (1) herein, where the value of $Off_{add}$ is a function of the active set size K for the different plotted values of initial offset $Off_{add\,0}$ and slope $Off_{addS}$.

The inventors have run several simulations according to the above embodiment utilizing equation (1), varying the values for the active set size K and for $\text{Off}_{add}$, for which result are plotted at FIG. 3. For these simulations, the initial add window $\text{Off}_{add\,0}$ is set to 3 dB, 6 dB, 9 dB and 12 dB. Moreover, for each $\text{Off}_{add\,0}$ value the slope $\text{Off}_{addS}$, of the linear adaptation of $\text{Off}_{add}$ is set to 0, 1.5, 3 and 4.5. The result of setting $\text{Off}_{addS}=0$ is equivalent to the conventional solution for 3G soft handover with a fixed setting of initial add/remove window; e.g., there is no autonomous adaptation by the UE of the configuration parameters. The conventional 3G solution will be used as a reference for comparison. As described above, the remove window Off_remove is adapted based on the add window $\text{Off}_{add}$ which is computed per Equation (1). Specifically, FIG. 3 shows the value of $\text{Off}_{add}$ as a function of the active set size K for different values of initial offset $\text{Off}_{add\,0}$ and slope $\text{Off}_{addS}$, which are parameters that in some embodiments the network may configure for the UE.

The inventors further evaluated the performance of implementing equation (1) in terms of the following key performance indicators (KPIs):

5-percentile, 50-percentile and average throughput;
Normalized count of RLFs defined as the number of RLFs per user per minute; and
Normalized count of active set updates defined as the number of active set updates per user per minute.

As to the third KPI above, an active set update could occur when a cell is added or removed. With every update to the active set, the network sends relevant signaling to the user concerning the added/removed cell. This performance indicator therefore evaluates the level of signaling overhead caused by the change to the active set.

Figure 4:
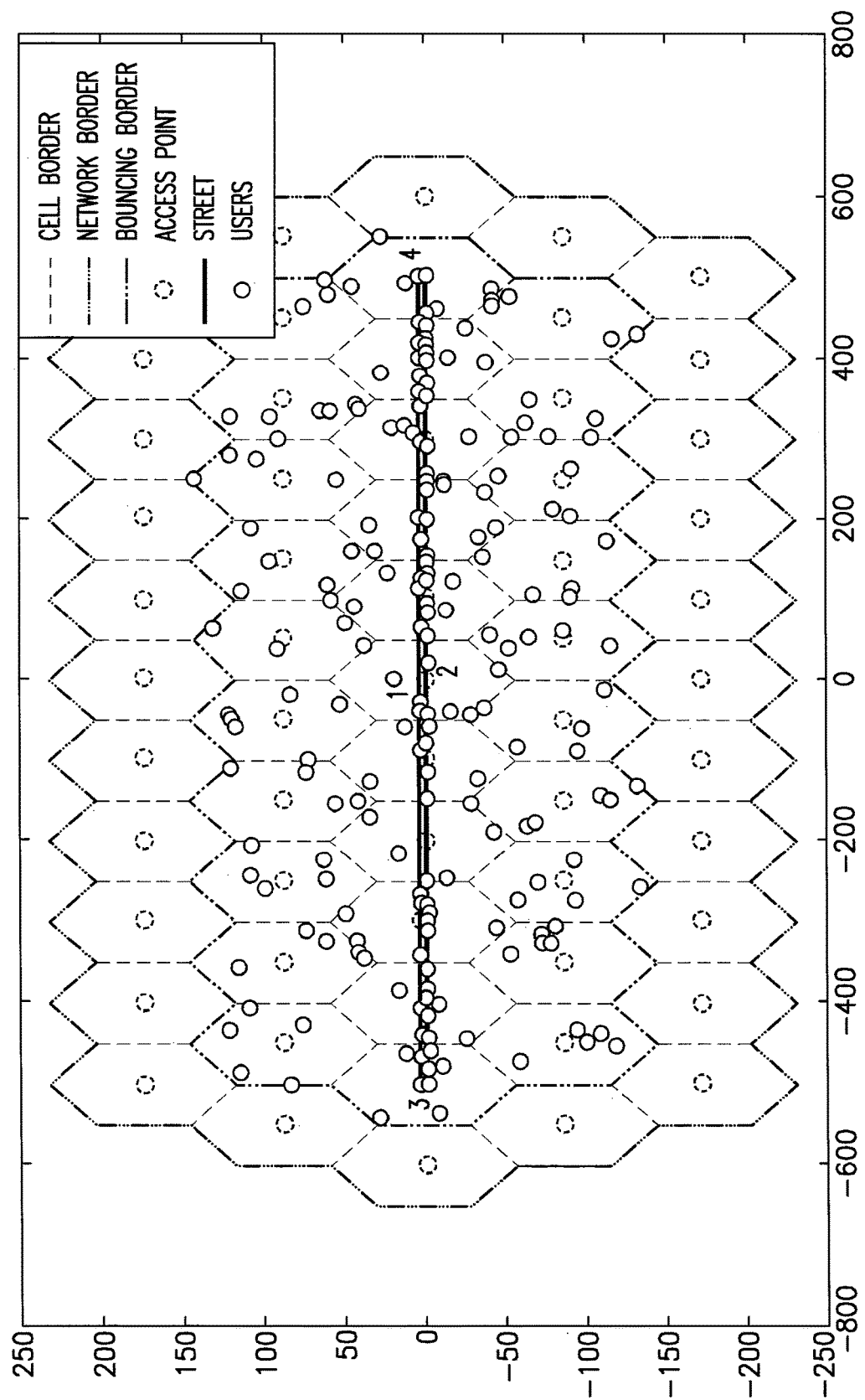
FIG. 4 is a conceptual plan view of a radio environment in which performance of certain embodiments were evaluated, an ultra-dense network with 257 UEs in cars on the streets moving at 60 km/h and other UEs moving randomly at 3 km/h.

Performance was evaluated for a UE operating in an Ultra Dense Network (UDN) as shown at FIG. 4, in which there are 257 street-bound users/UEs each in a car that is randomly distributed with an average inter-car distance of half the car's speed in km/h. The speed of the cars is 60 km/h. Slow-moving users/UEs are each moving in a random direction at a speed of 3 km/h.

Figure 5C:
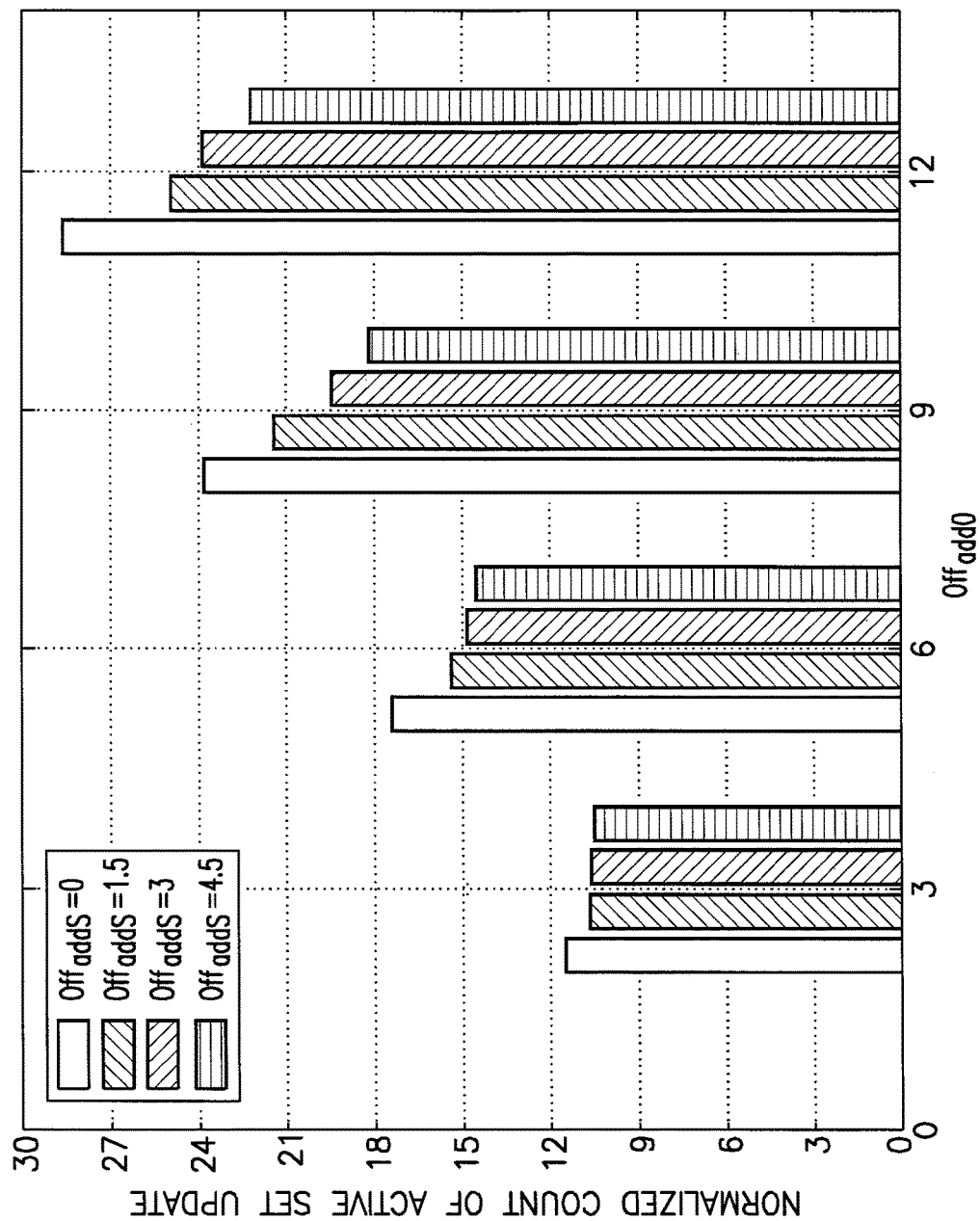
Figure 5D:
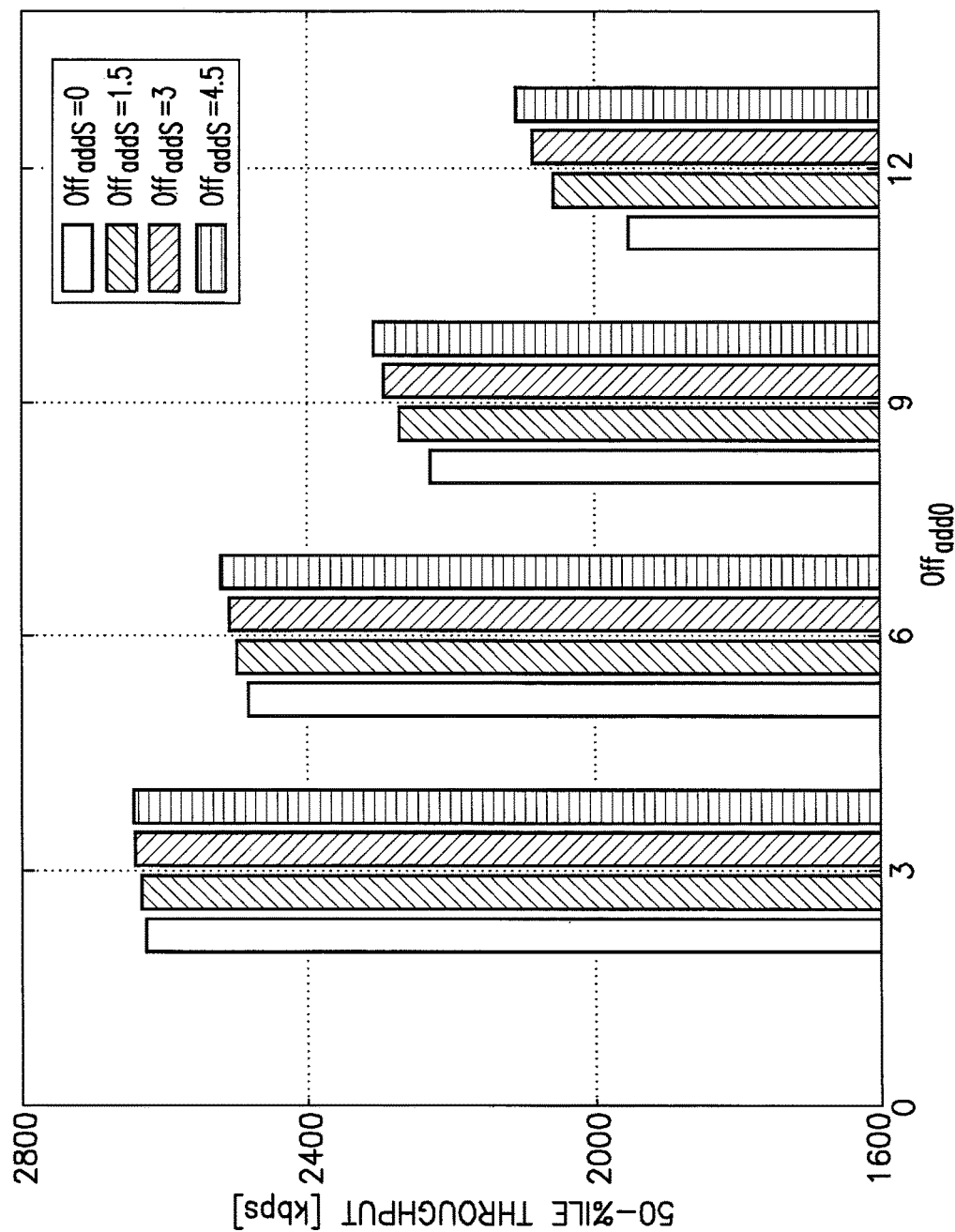
Figure 5E:
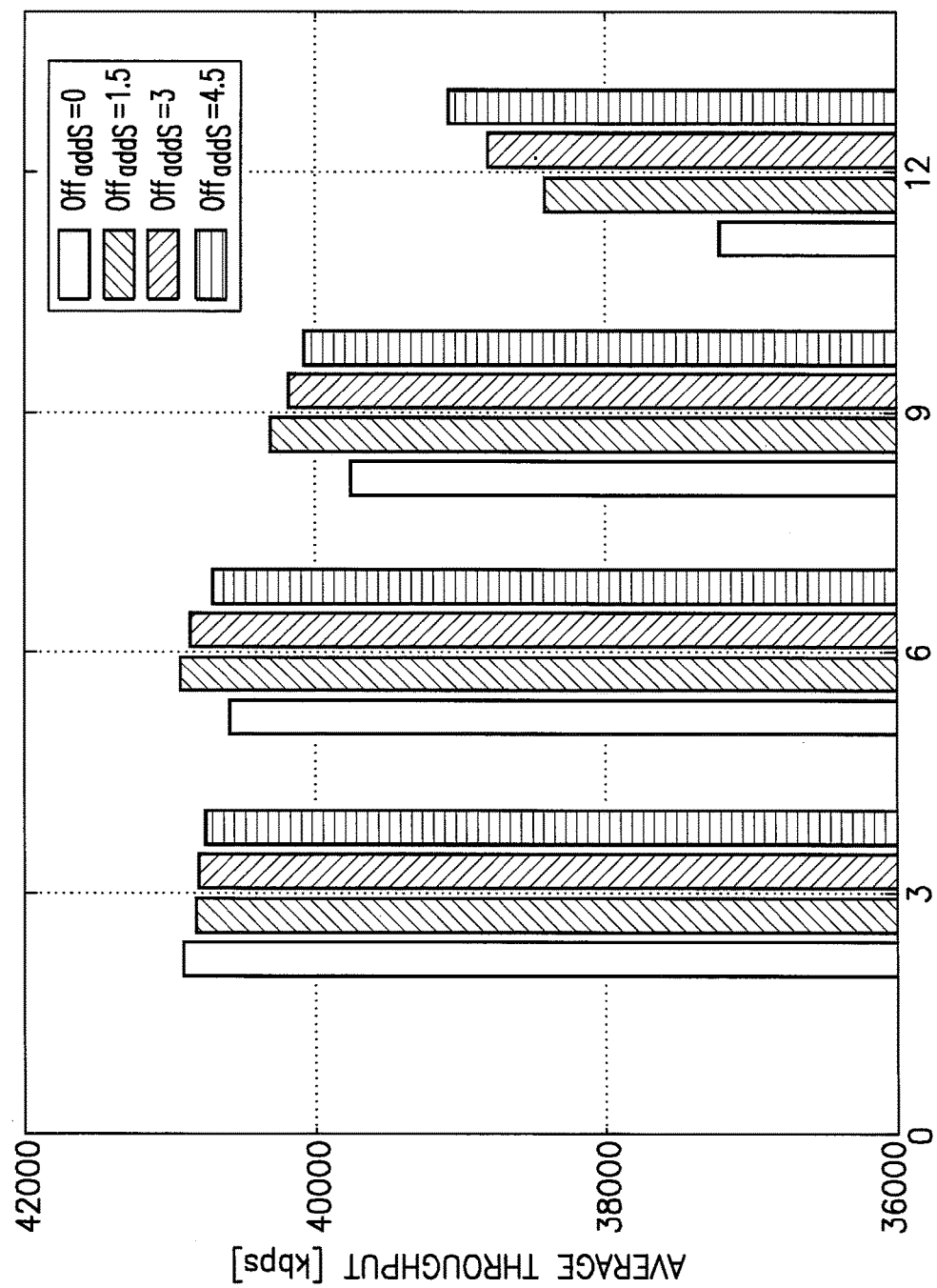

The various data plots in FIGS. 5A-5E show the performance of the proposed adaptive parameter configuration of the trigger event with respect to the KPIs defined above. The value of each KPI is shown as a function of initial offset $\text{Off}_{add\,0}$ and slope $\text{Off}_{addS}$. The 3G prior art solution with fixed parameter configuration of the trigger event corresponds to the case when $\text{Off}_{addS}=0$ and is shown as the left-most bar on these charts as a reference. Specifically, FIG. 5A shows the normalized RLF count, FIG. 5B shows the 5$^{th}$ percentile throughput, FIG. 5C shows the normalized count of active set updates, FIG. 5D shows the 50$^{th}$ percentile throughput, and FIG. 5E shows the average throughput. Throughputs in FIGS. 5B, 5D and 5E are in kbps.

According to FIG. 5A, the RLFs are totally resolved by both methods for $\text{Off}_{add\,0}=9$ and 12 dB. The gains in other KPIs are summarized in the table at FIG. 6 for $\text{Off}_{add\,0}9$ and 12 dB and different slope values of $\text{Off}_{addS}$.

FIG. 6 shows that the count of active set updates has been considerably reduced in all settings. In particular, for $\text{Off}_{add\,0}=9$ and $\text{Off}_{addS}=4.5$ the reduction in the count of active set updates is 23.88% and for $\text{Off}_{add\,0}=12$ and $\text{Off}_{addS}=4.5$ the reduction is 22.11%. For $\text{Off}_{add\,0}=9$ and almost all settings of $\text{Off}_{addS}$, this significant gain in the count of active set updates is achieved without any degradation in 5$^{th}$ percentile, 50$^{th}$ percentile and average throughput (except there is some very slight degradation in the 5$^{th}$ percentile throughput for $\text{Off}_{add\,0}=9$ and $\text{Off}_{addS}=1.5$). For $\text{Off}_{add\,0}=12$, the 5$^{th}$ percentile, 50$^{th}$ percentile and average throughput have even improved with an average gain of roughly 10% in the 5$^{th}$ percentile throughput, roughly 7% gain in the 50$^{th}$ percentile throughput and roughly a 4% gain in average throughput (i.e., the average computed for $\text{Off}_{add\,0}=12$ and overall $\text{Off}_{addS}$ values).

While the above examples clarify certain embodiments of the invention, they do not represent the outer bounds of how the invention may be implemented. For example, above it was assumed that the best cell in the UE's active set would be used but instead these teachings can be implemented using the worst cell; in principle the overall concept is the same but the appropriate values for the described parameters would of course be quite different in the 'worst cell' implementation. For example, $\text{Off}_{add}$ would likely be more in the range of 0 dB, as compared with the −6 dB range in the example above when using the maximum operator. In this case the first algorithm for adding a cell might be:

$$Mn + Ocn > \min_{s \in A}(Ms) + \mathit{Off}_{add}; \qquad \text{(Eq. 3)}$$

and similarly the second algorithm for removing a cell might be:

$$Ms0 + Ocs0 < \min_{s \in A}(Ms) + \mathit{Off}_{remove}. \qquad \text{(Eq. 4)}$$

Now instead of using a single condition for adding a cell, two conditions would be used using min and max operators at the same time. The UE would send a cell measurement report only when both these conditions are fulfilled as below.

The 2 conditions for adding a cell from the UE's active set:

$$Mn + \hat{O}cn > \min_{s \in A}(Ms) + \hat{O}\!f\!f_{add},$$

and $$Mn + Ocn > \max_{s \in A}(Ms) + \mathit{Off}_{add}$$

The 2 conditions for removing a cell from the UE's active set:

$$Ms0 + \hat{O}cs0 < \min_{s \in A}(Ms) + \hat{O}\!f\!f_{remove},$$

and $$Ms0 + Ocs0 < \max_{s \in A}(Ms) + O\!f\!f_{remove}.$$

As above, instead of using the AND combination another implementation could also use an OR combination, i.e. a report is sent if either of the conditions are fulfilled.

In a still further implementation a different condition could be used, depending on whether the maximum allowed size of the active set has been reached or not. For example, as long as the size of the active set is below the pre-defined maximum, the neighbor cell measurement (e.g., RSRP or RSRQ) would only be compared against the best cell of the UE's active set, but when the maximum size of the UE's active set has been reached, the neighbor cell measurement would be compared against the best and the worst cells in the UE's active set. If both of these triggers fire when K is at its allowed maximum, the UE will send its cell measurement report and the network will replace the worst cell in the UE's active set with the new cell the UE just reported.

Figure 7:
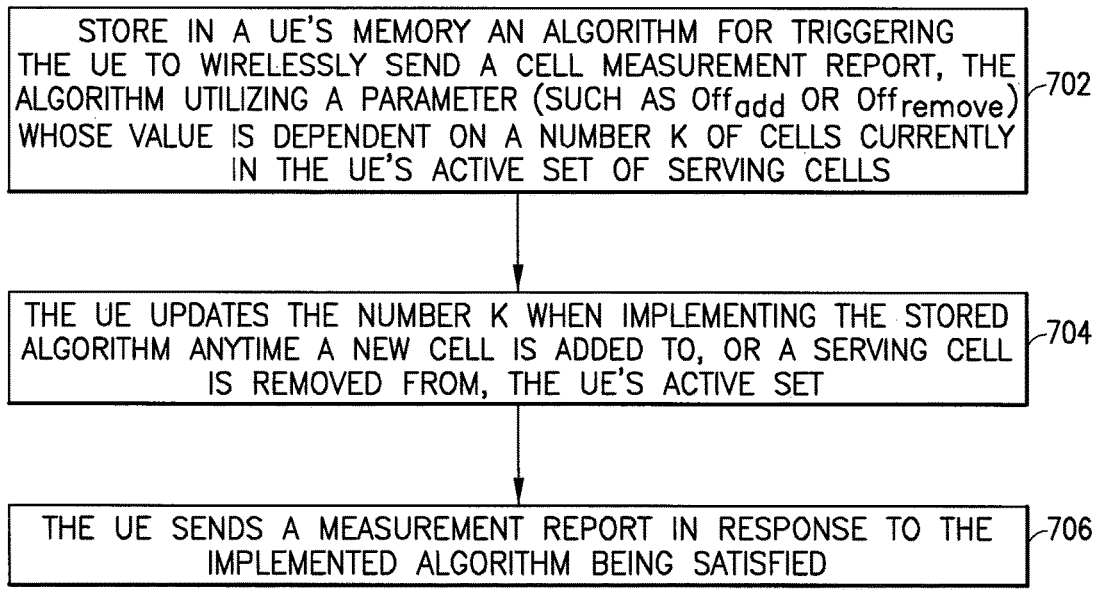
FIG. 7 is a process flow diagram summarizing certain aspects of the invention from the perspective of an individual UE.

FIG. 7 is a flow diagram from the perspective of the UE that summarizes some of the above features. In practice a given UE may implement some or all of these steps of FIG. 1, depending on the specific implementation of the broader teachings herein. It begins at block 702 where the algorithm for triggering a UE to wirelessly send a cell measurement report is stored in a memory of the UBE, where the algorithm utilizes a parameter whose value is dependent on a number K of cells currently in the UE's active set of serving cells (K is an integer greater than one). The above examples gave various non-limiting options for this algorithm, including:

$$Mn + Ocn > \max_{s \in A}(Ms) + O\!f\!f_{add},$$

$$Ms0 + Ocs0 < \max_{s \in A}(Ms) + O\!f\!f_{remove},$$

$$Mn + \hat{O}cn > \min_{s \in A}(Ms) + \hat{O}\!f\!f_{add},$$

and $$Ms0 + \hat{O}cs0 < \min_{s \in A}(Ms) + \hat{O}\!f\!f_{remove}.$$

The above examples provide specific implementations for the parameter (such as $O\!f\!f_{add}$ or $O\!f\!f_{remove}$) whose value varies with the number K. Generally in these examples for the case of adding a new cell to the UE's active set, increasing values of signal strength RSRP and/or signal quality RSRQ for the cell being measured are required to satisfy the algorithm for increasing values of K. Similarly for the $O\!f\!f_{remove}$ examples for removing an existing cell from the UE's active set, progressively higher values of signal strength RSRP and/or signal quality RSRQ for the cell being measured can satisfy the algorithm for progressively higher values of K. That the higher RSRP/RSRQ values can satisfy the remove algorithm for higher values of K arises from the fact that in the above examples equation 3 is a greater-than comparison whereas equation 4 is a less-than comparison. More specifically the value of the offset is computed using at least one of the following pairs of values: a network-adjustable slope value provided to the UE and a default offset value (first pair); minimum and maximum allowable values for the number K (second pair); and minimum and maximum values for the offset (third pair). In one example above for the case a new cell is added to the UE's active set this offset is $O\!f\!f_{add}$, whose value is given by $O\!f\!f_{add} = O\!f\!f_{add0} - (K-1) \cdot O\!f\!f_{addS}$; in which $O\!f\!f_{add0}$ is a default value not adjustable by the UE and $O\!f\!f_{addS}$ is a network-adjustable slope value provided to the UE. In another example above for the case a new cell is added to the UE's active set the offset is $O\!f\!f_{add}$ whose value is computed using both of the above minimum and maximum K and offset values, and is given by $$O\!f\!f_{add} = aK + b$$

where $$a = \frac{(\text{Max\_Off}_{add} - \text{Min\_Off}_{add})}{(K_{max} - K_{min})}$$

and $$b = \text{Max\_Off}_{add} - a * K_{max}.$$

Returning to the broader aspects of these teachings, at block 704 the UE updates the number K when implementing the stored algorithm anytime a new cell is added to, or a serving cell is removed from, the UE's active set. That is, if the size K of the UE's active set has changed since the last time the UE ran the algorithm, the UE updates the value of K to reflect the size of its current active set before running the algorithm again. Finally at block 706 the UE sends a measurement report in response to the implemented algorithm being satisfied.

For the case in which a new cell is to be added to the UE's active set, if currently the number K is less than a pre-defined maximum allowable value the algorithm is satisfied when signal strength and/or signal quality of the new cell is within the add window with respect to the best cell; else if the number K is at the pre-defined maximum allowable value the algorithm is satisfied when signal strength and/or signal quality of the new cell is within the different add windows with respect to the best and worst cell in the UE's active set and in response to this latter instance the UE replaces the worst cell in the active set with the new cell. Non-limiting examples of such add windows are detailed above, where two conditions using min and max operators are required to be satisfied at the same time in order to trigger the UE to send a cell measurement report.

For the case in which these teachings are used for both adding cells to and removing cells from the UE's active set, then the algorithm mentioned at block 702 may be considered a first algorithm which the UE implements anytime a new cell is added to the UE's active set and the cell measurement report is a neighbor cell measurement report. In this case the UE will have stored in it memory also a second algorithm for triggering the UE to wirelessly send a cell measurement report, in which the second algorithm is also dependent on the number K of cells currently in the UE's active set of serving cells. Like the cell-add first algorithm, for the cell-remove second algorithm the UE updates the number K when implementing this stored second algorithm anytime a serving cell is removed from the UE's active set; and the UE sends a measurement report in response to the implemented second algorithm being satisfied. For the cell-remove case the cell measurement report is on the cell that the UE removed from its active set, so at the time the UE took that measurement this cell was a serving cell and not yet a neighbor cell.

Above it was detailed that the neighbor cells that are viable candidates for addition to the UE's active set are in the same baseband pool or 'cloud' as those cells already in the active set. A common baseband pool is but one example of a predefined relation that must exist for the neighbor cell to be a viable candidate for addition, and in various implementations other predefined relationship(s) must be satisfied to consider a given neighbor cell as a viable candidate for addition to the UE's active set. Stating this aspect of the invention more generally, for the case that the algorithm mentioned at block 702 is used to evaluate a neighbor cell for possible addition to the UE's active set, this algorithm is implemented/run by the UE only when the neighbor cell is characterized as being within a predefined relation with each serving cell of the UE's active set, else the UE implements an alternative algorithm directed to handover of the UE to the neighbor cell that is not characterized as being within the predefined relation. This does not mean the UE will be handed over, only that the alternative algorithm is directed toward that end; still the handover may depend on other factors such as traffic loading and other options which the network may take into account in its final handover decision.

FIG. 7 itself can be considered as an algorithm, and more generally represents steps of a method, and/or certain code segments of software stored on a computer readable memory or memory device that embody the FIG. 7 algorithm for implementing the cell-add and/or cell-remove algorithms that depend on the offset which varies with the value of K. In this regard the invention may be embodied as a non-transitory program storage device readable by a machine such as for example one or more processors of a UE, where the storage device tangibly embodies a program of instructions executable by the machine for performing operations such as those shown at FIG. 7 and detailed above, and where the program storage device has stored thereon an algorithm for triggering a user equipment (UE) to wirelessly send a cell measurement report.

For implementation by the network the network access node such as one or more of the UE's serving cells configure the UE with the default values for the offset and if applicable for a given implementation also the slope. The network access node may also track in its local memory for each of its connected UEs the value of K, how many serving cells are currently in the individual UE's active set. As described above for certain embodiments, the network access node determines whether to add a new cell to, or remove an existing cell from, a given UE's active set of serving cells (e.g., this decision may be based on cell measurement reports received from that same UE). The network access node reconfigures the UE whenever a new cell is added to, or an existing cell is removed from, the UE's active set, and the network access node is also configured to provide to the UE at least one value for computing a parameter whose value depends on the number K of cells currently in the UE's active set, where K is an integer greater than one and the parameter is for use in an algorithm that triggers the UE to send the cell measurement report and the provided value is other than K. If the network access node is tracking the K values per UE it updates the number K of cells tracked in its local memory for that individual UE, typically when it reconfigures that individual UE as above. In relevant implementations for the network access node this at least one value may be one or more of the maximum and minimum values for K and for the offset parameter, or consistent with the other algorithm above for computing the offset this one or more value may be one or both of the default offset value and the network-adjustable slope value. These one or more values can be sent via dedicated signaling or the network access node may broadcast it in system information. In other implementations one, some or all of these default and maximum/minimum values are published in a wireless standard and stored in both the UE's and the network access node's memory, without the need for specific signaling between these two entities of the standardized values.

Figure 8:
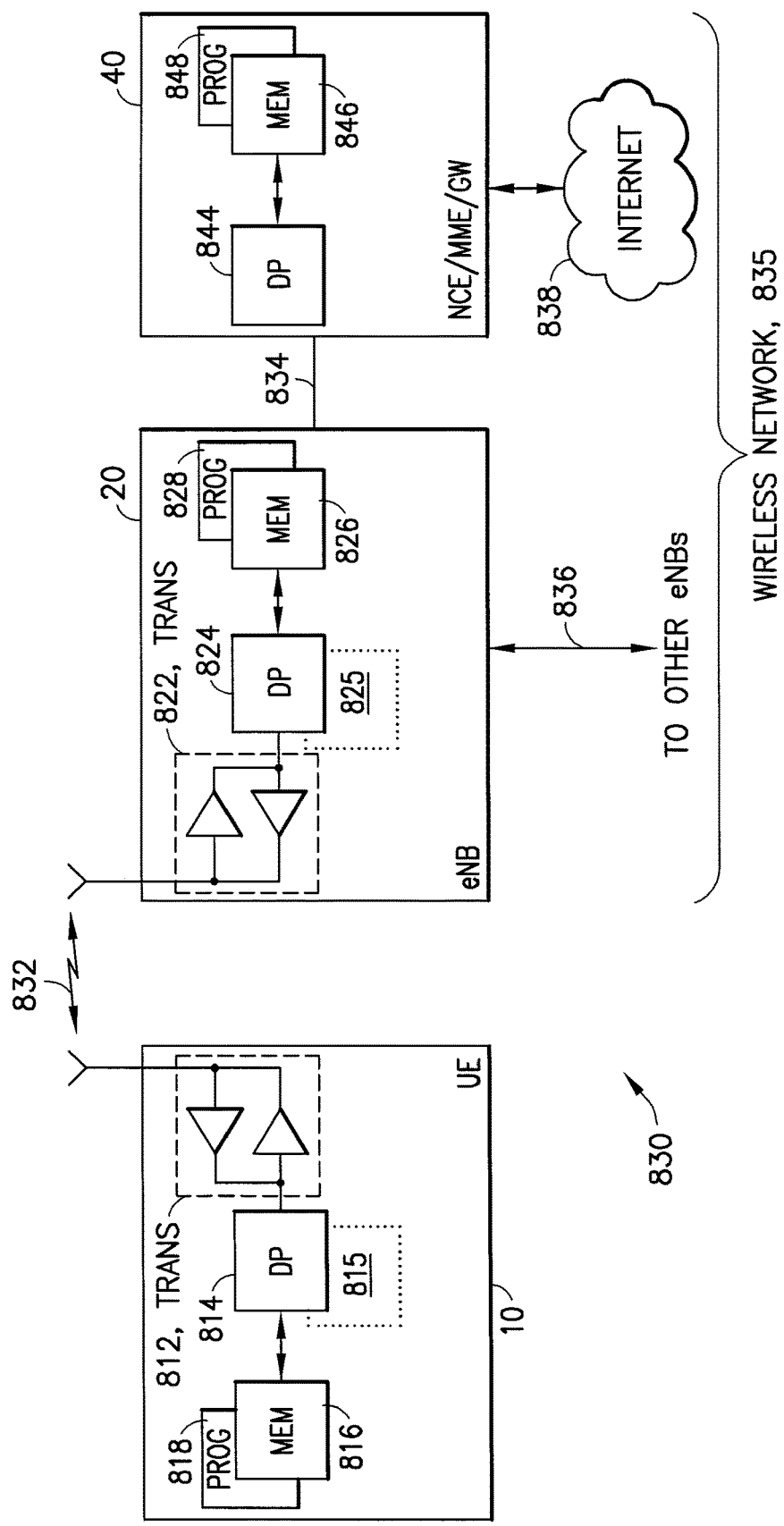
FIG. 8 is a diagram illustrating some components of the UE, eNB and MME that are suitable for practicing various aspects of the invention.

FIG. 8 is a high level diagram illustrating some relevant components of various communication entities that may implement various portions of these teachings, including a network access node shown particularly as an eNB 20, a network control element (NCE, or a mobility management entity MME or a gateway GW) 40, and a user equipment (UE) 10. In the wireless system 830 of FIG. 8 a wireless network 835 is adapted for communication over a wireless link 832 with an apparatus, such as a mobile communication device which may be referred to as a UE 10, via a network access node, such as a Node B (base station), and more specifically an eNB 20. The network 835 may include a network control element (NCE) 840 that may include MME/Serving-GW functionality, and which provides connectivity with a network, such as a telephone network and/or a data communications network (e.g., the internet 838).

The UE 10 includes a controller, such as a computer or a data processor (DP) 814 (or multiple ones of them), a computer-readable memory medium embodied as a memory (MEM) 816 (or more generally a non-transitory program storage device) that stores a program of computer instructions (PROG) 818, and a suitable wireless interface, such as radio frequency (RF) transceiver 812, for bidirectional wireless communications with the eNB 20 via one or more antennas. In general terms the UE 10 can be considered a machine that reads the MEM/non-transitory program storage device and that executes the computer program code or executable program of instructions stored thereon. While each entity of FIG. 8 is shown as having one MEM, in practice each may have multiple discrete memory devices and the relevant algorithm(s) and executable instructions/program code may be stored on one or across several such memories.

In general, the various embodiments of the UE 10 can include, but are not limited to, cellular telephones, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The eNB 20 also includes a controller, such as a computer or a data processor (DP) 824 (or multiple ones of them), a computer-readable memory medium embodied as a memory (MEM) 826 that stores a program of computer instructions (PROG) 828, and a suitable wireless interface, such as RF transceiver 822, for communication with the UE 10 via one or more antennas. The eNB 20 is coupled via a data/control path 834 to the NCE 40. The path 834 may be implemented as an interface. The eNB 20 may also be coupled to another eNB via data/control path 836, which may be implemented as an interface.

The NCE 840 includes a controller, such as a computer or a data processor (DP) 844 (or multiple ones of them), a computer-readable memory medium embodied as a memory (MEM) 846 that stores a program of computer instructions (PROG) 848.

At least one of the PROGs 818, 828 and 848 is assumed to include program instructions that, when executed by the associated one or more DPs, enable the device to operate in accordance with exemplary embodiments of this invention. That is, various exemplary embodiments of this invention may be implemented at least in part by computer software executable by the DP 814 of the UE 10; by the DP 824 of the eNB 20; and/or by the DP 844 of the NCE 40, or by hardware, or by a combination of software and hardware (and firmware).

For the purposes of describing various exemplary embodiments in accordance with this invention the UE 10 and the eNB 20 may also include dedicated processors.

The computer readable MEMs 816, 826 and 846 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 812 and 822) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

What is claimed is:

1. A method comprising:
    storing in a memory of a user equipment (UE) an algorithm for triggering the UE to wirelessly send a cell measurement report, the algorithm utilizing an offset whose value is dependent on a number K of cells currently in the UE's active set of serving cells, where K is an integer greater than one and where the offset is used in a trigger event for determining when to trigger the cell measurement report;
    implementing the algorithm at least by, for anytime the number K is changed, updating, autonomously by the UE and dependent on the determined number K of cells in the UE's active set, the offset;
    the implementing determining to trigger by the trigger event the UE to send the cell measurement report based at least on the updated offset; and
    the UE sending the cell measurement report in response to the trigger event.

2. The method according to claim 1, wherein at least one of:
    increasing values of signal strength and/or signal quality for the cell being measured are required based on the value of the offset to cause the algorithm to trigger the UE for increasing values of K for a case of adding a cell to the active set, and
    progressively higher values of signal strength and/or signal quality for the cell being measured are required based on the value of the offset to cause the algorithm to trigger the UE for progressively higher values of K for a case of removing a cell from the active set.

3. The method according to claim 2, wherein the value of the offset is computed using at least one pair of the following pairs of values:
    a network-adjustable slope value provided to the UE and a default offset value;
    minimum and maximum allowable values for the number K; and
    minimum and maximum values for the offset.

4. The method according to claim 3, wherein for the case a new cell is added to the UE's active set the offset is $\text{Off}_{add}$, whose value is given by $$\text{Off}_{add} = \text{Off}_{add0} - (K-1) \cdot \text{Off}_{addS};$$

in which $\text{Off}_{add0}$ is the default value which is not adjustable by the UE and $\text{Off}_{addS}$ is the network-adjustable slope value provided to the UE.

5. The method according to claim 3, wherein for the case a new cell is added to the UE's active set the offset is $\text{Off}_{add}$ whose value is given by:

$$\text{Off}_{add} = aK + b$$

where $$a = \frac{(\text{Max\_Off}_{add} - \text{Min\_Off}_{add})}{(K_{max} - K_{min})}$$

and $$b = \text{Max\_Off}_{add} - a * K_{max},$$

where $K_{max}$ and $K_{min}$ are the maximum and minimum allowable values for the number K; and $\text{Max\_Off}_{add}$ and $\text{Min\_Off}_{add}$ are the maximum and minimum allowable values for the offset $\text{Off}_{add}$.

6. The method according to claim 1, wherein for the case a new cell is to be added to the UE's active set:
if the number K is less than a pre-defined maximum allowable value the algorithm will trigger the UE in response to signal strength and/or signal quality of the new cell being within an add window with respect to a best cell currently in the UE's active set;
else if the number K is at the pre-defined maximum allowable value the algorithm will trigger the UE in response to signal strength and/or signal quality of the new cell being within add windows with respect to the best cell and the worst cell currently in the UE's active set, and in response the UE replaces the worst cell in the active set with the new cell.

7. The method according to claim 1 where the algorithm is a first algorithm which the UE implements anytime a new cell is added to the UE's active set, the method further comprising:
storing in the memory of the UE a second algorithm for triggering the UE to wirelessly send a cell measurement report, the second algorithm dependent on the number K of cells currently in the UE's active set of serving cells;
implementing the stored second algorithm at least by the UE updating the number K anytime a serving cell is removed from the UE's active set, the implementing the stored second algorithm determining to trigger the UE to send the cell measurement report based at least on the updated number K; and
the UE sending the cell measurement report in response to the trigger to send the cell measurement report based at least on the updated number K.

8. An apparatus comprising:
at least one processor; and
at least one non-transitory memory including computer program code comprising an algorithm for triggering a user equipment (UE) to wirelessly send a cell measurement report, the algorithm utilizing an offset whose value is dependent on a number K of cells currently in the UE's active set of serving cells, where K is an integer greater than one and where the offset is used in a trigger event for determining when to trigger the cell measurement report;
wherein the at least one memory and the computer program code configured, with the at least one processor, to cause the apparatus to:
implement the algorithm at least by, for anytime the number K is changed, updating, autonomously by the UE and dependent on the determined number K, the offset;
the implementing determining to trigger by the trigger event the UE to send the cell measurement report based at least on the updated offset; and
cause the UE to send the cell measurement report in response to the trigger event.

9. The apparatus according to claim 8, wherein and at least one of:
increasing values of signal strength and/or signal quality for the cell being measured are required based on the value of the offset to cause the algorithm to trigger the UE for increasing values of K for the case of adding a cell to the active set, and
progressively higher values of signal strength and/or signal quality for the cell being measured are required based on the value of the offset to cause the algorithm to trigger the UE for progressively higher values of K for the case of removing a cell from the active set.

10. The apparatus according to claim 9, wherein the value of the offset is computed using at least one pair of the following pairs of values:
a network-adjustable slope value provided to the UE and a default offset value;
minimum and maximum allowable values for the number K; and
minimum and maximum values for the offset.

11. The apparatus according to claim 10, wherein for the case a new cell is added to the UE's active set the offset is $\text{Off}_{add}$, whose value is given by $$\text{Off}_{add} = \text{Off}_{add0} - (K-1) \cdot \text{Off}_{addS};$$

in which $\text{Off}_{add0}$ is the default value which is not adjustable by the UE and $\text{Off}_{addS}$ is the network-adjustable slope value provided to the UE.

12. The apparatus according to claim 10, wherein for the case a new cell is added to the UE's active set the offset is $\text{Off}_{add}$ whose value is given by $$\text{Off}_{add} = aK + b$$

where $$a = \frac{(\text{Max\_Off}_{add} - \text{Min\_Off}_{add})}{(K_{max} - K_{min})}$$

and $$b = \text{Max\_Off}_{add} - a * K_{max},$$

where $K_{max}$ and $K_{min}$ are the maximum and minimum allowable values for the number K; and $\text{Max\_Off}_{add}$ and $\text{Min\_Off}_{add}$ add are the maximum and minimum allowable values for the offset $\text{Off}_{add}$.

13. The apparatus according to claim 8, wherein for the case a new cell is to be added to the UE's active set:
if the number K is less than a pre-defined maximum allowable value the algorithm will trigger the UE in response to signal strength and/or signal quality of the new cell being within an add window with respect to a best cell currently in the UE's active set;
else if the number K is at the pre-defined maximum allowable value the algorithm will trigger the UE in response to signal strength and/or signal quality of the new cell being within the add windows with respect to the best and the worst cell currently in the UE's active set, and in response the UE replaces the worst cell in the active set with the new cell.

14. The apparatus according to claim 8, where the algorithm is a first algorithm which the computer program code causes the UE to implement anytime a new cell is added to the UE's active set,
the computer program code further comprising a second algorithm for triggering the UE to wirelessly send a cell measurement report, the second algorithm dependent on the number K of cells currently in the UE's active set of serving cells;
wherein the at least one memory and the computer program code are configured, with the at least one processor, to cause the apparatus further to:
implementing the stored second algorithm at least to update the number K anytime a serving cell is removed from the UE's active set, the implementing the stored second algorithm determining to trigger the UE to send the cell measurement report based at least on the updated number K; and
cause the UE to send the cell measurement report in response to the trigger to send the cell measurement report based at least on the updated number K.

15. The apparatus according to claim 8, wherein for the case the algorithm is used to evaluate a neighbor cell,
the computer program code causes the UE to implement the algorithm only when the neighbor cell is characterized as being within a predefined relation with each serving cell of the UE's active set, else the computer program code causes the UE to implement an alternative algorithm directed to handover of the UE to the neighbor cell that is not characterized as being within the predefined relation.

16. An apparatus comprising:
at least one processor; and
at least one non-transitory memory including computer program code configured, with the at least one processor, to cause the apparatus to:
determine whether to add a cell to or remove a cell from a user equipment's (UE's) active set of serving cells;
reconfigure the UE in response to a new cell being added to or an existing cell being removed from the UE's active set of serving cells; and
provide to the UE at least one value for computing an offset whose value depends on a number K of cells determined by the UE to be currently in the UE's active set, where K is an integer greater than one, and where the offset is to be used in a trigger event for determining when to trigger by the UE a cell measurement report, and the provided value is other than K; and
receiving the cell measurement report from the UE, the received cell measurement report indicating the UE executed an algorithm that updated the offset whose value is dependent on the determined number K and that triggered the UE to send the cell measurement report based at least on the updated offset.

17. The apparatus according to claim 16, wherein the provided value comprises at least one of the following pairs of values:
a default offset value and a slope value; and
maximum and minimum allowable values for K and for the offset.

18. The apparatus according to claim 17, wherein the offset is $\text{Off}_{add}$ whose value is given by $$\text{Off}_{add} = \text{Off}_{add0} - (K-1) \cdot \text{Off}_{addS};$$

in which $\text{Off}_{add0}$ is the default value which is not adjustable by the UE and $\text{Off}_{addS}$ is the network-adjustable slope value provided to the UE.

19. The apparatus according to claim 17, wherein the offset is $\text{Off}_{add}$ whose value is given by $$\text{Off}_{add} = aK + b$$

where $$a = \frac{(\text{Max\_Off}_{add} - \text{Min\_Off}_{add})}{(K_{max} - K_{min})}$$

and $$b = \text{Max\_Off}_{add} - a * K_{max},$$

wherein:
$K_{max}$ and $K_{min}$ are respectively maximum and minimum allowable values for the number K which the apparatus provides to the UE; and
$\text{Max\_Off}_{add}$ and $\text{Min\_Off}_{add}$ are respectively maximum and minimum allowable values for the offset $\text{Off}_{add}$ which the apparatus provides to the UE.

20. The method according to claim 1, wherein the algorithm triggers the UE to send the cell measurement based upon criteria comprising the offset, wherein the criteria cause the trigger be sent to indicate a cell should be added to the set of serving cells or to indicate a cell should be removed from the set of serving cells.

* * * * *